United States Patent
Roh (10) Patent No.: US 10,537,090 B2
(45) Date of Patent: Jan. 21, 2020

(54) MODULAR APPARATUS FOR CLEANING PET TOILET DEVICE

(71) Applicant: DOGTOTO CO., LTD., Incheon (KR)

(72) Inventor: Juhwan Roh, Incheon (KR)

(73) Assignee: DOGTOTO CO., LTD., Incheon (KR)

( * ) Notice: Subject to any disclaimer, the term of this patent is extended or adjusted under 35 U.S.C. 154(b) by 137 days.

(21) Appl. No.: 15/756,948

(22) PCT Filed: Dec. 15, 2015

(86) PCT No.: PCT/KR2015/013721
§ 371 (c)(1),
(2) Date: Mar. 1, 2018

(87) PCT Pub. No.: WO2017/039076
PCT Pub. Date: Mar. 9, 2017

(65) Prior Publication Data
US 2018/0249671 A1    Sep. 6, 2018

(30) Foreign Application Priority Data

Sep. 2, 2015  (KR) .......................... 10-2015-0124058

(51) Int. Cl.
| | |
|---|---|
| *A01K 1/01* | (2006.01) |
| *A01K 29/00* | (2006.01) |
| *B08B 3/02* | (2006.01) |
| *B01D 35/02* | (2006.01) |
| *F04D 13/08* | (2006.01) |
| *G05D 9/12* | (2006.01) |
| *A01K 23/00* | (2006.01) |

(52) U.S. Cl.
CPC ............ *A01K 1/011* (2013.01); *A01K 23/005* (2013.01); *A01K 29/005* (2013.01); *B01D 35/02* (2013.01); *B08B 3/02* (2013.01); *F04D 13/08* (2013.01); *G05D 9/12* (2013.01)

(58) Field of Classification Search
CPC .... A01K 1/011; A01K 1/0114; A01K 1/0121; A01K 23/005; A01K 29/005
USPC .......................... 119/163, 161, 166, 479, 665
See application file for complete search history.

(56) References Cited

U.S. PATENT DOCUMENTS 4,117,555 A * 10/1978 Dennis ................... A01K 1/011
119/163
5,996,533 A * 12/1999 Gordon ................ A01K 1/0114
119/166

(Continued)

FOREIGN PATENT DOCUMENTS

| JP | 3179840 U | 11/2012 |
| KR | 10-1178799 B1 | 8/2012 |

(Continued)

*Primary Examiner* — Yvonne R Abbott-Lewis
(74) *Attorney, Agent, or Firm* — Maschoff Brennan (57) ABSTRACT

The present invention relates to a modular apparatus for cleaning a pet toilet device and, more specifically, to an apparatus for cleaning a pet toilet device, the apparatus being improved so as to prevent the problem of overflowing or unnecessary flow of water, and comprising three structures of: a main structure, which automatically cleans the toilet device after a pet defecates, particularly, after urination; a sub-structure; and a water container, which are formed and coupled into modular units so as to be slim and compact, wherein cleaning can be carried out by only the main structure without the sub-structure.

6 Claims, 6 Drawing Sheets

(56) References Cited

U.S. PATENT DOCUMENTS

| | | | |
|---|---|---|---|
| 10,212,915 B1 * | 2/2019 | Brown | A01K 1/0114 |
| 2003/0051672 A1 | 3/2003 | Gordon et al. | |
| 2007/0125309 A1 * | 6/2007 | Gordon | A01K 1/011 |
| | | | 119/166 |
| 2008/0178817 A1 * | 7/2008 | Brewer | A01K 1/011 |
| | | | 119/163 |
| 2009/0241849 A1 * | 10/2009 | Fournier | A01K 1/011 |
| | | | 119/161 |
| 2015/0053140 A1 * | 2/2015 | Roh | A01K 1/011 |
| | | | 119/163 |
| 2018/0249671 A1 * | 9/2018 | Roh | A01K 23/005 |

FOREIGN PATENT DOCUMENTS

| | | |
|---|---|---|
| KR | 10-1282198 B1 | 7/2013 |
| KR | 10-1282200 B1 | 7/2013 |
| KR | 10-2015-0027479 A | 3/2016 |

* cited by examiner

MODULAR APPARATUS FOR CLEANING PET TOILET DEVICE

TECHNICAL FIELD

The present invention relates to a modular apparatus for cleaning a pet toilet device and, more specifically, to an apparatus for cleaning a pet toilet device with improvement in preventing a problem of overflowing or unnecessary flow of water, including three structures of: a main structure, which automatically cleans the toilet device after a pet defecates, particularly, after urination; a sub-structure; and a water container, wherein these are formed and coupled into modular units so as to be slim and compact.

BACKGROUND ART

A major problem in raising a pet is to determine a specific defecation spot or place for the pet and train the pet to defecate in the same.

In the past, pets were mostly toilet trained to defecate on the floor of a bathroom. However, pet toilet devices with different functions have now been released and are available to thus offer convenience in cleaning the same.

In general, a conventional pet toilet device consists of a toilet plate (or toilet bowl) and a net and, if a pet sits on the net and defecates, an owner of the pet should collect feces on the net and separately collect urine gathered in the toilet plate via a thru-hole in the net.

In this case, the feces gathered on the net are relatively easy to collect, whereas the urine gathered in the toilet plate must be often cleaned along with the net after separating the net, thus causing inconvenience. Further, if cleaning is neglected, it causes a sanitary problem such that bad smell remains in a room.

In order to prevent the problems described above, Korean Patent No. 1178799 owned by the present applicant disclosed the invention entitled "Modular Apparatus for Cleaning Pet Toilet Device," which includes a water input module to supply water to a toilet device and a drainage module to gather the wastewater after cleaning the toilet device, wherein both of these modules can be installed in the form of an assembly, thus being conveniently used without regard to a space.

Moreover, Korean Patent No. 1282198 also owned by the present applicant has achieved advantages in that it can simply detect whether a pet sits on a toilet device by using a transmission sensor and a reception sensor and, simultaneously, different module combination structures are provided to accommodate convenience in using the same.

Among these, in case of Korean Patent No. 1282198, although water input and output functions in a modular manner are offered, this invention has a structure substantially suitable for a condition of directly supplying water and, since a water input module is not easily separated, the water should be directly drawn from the outside and then poured in the water input module in order to supply the water to the water input module, thus entailing inconvenience. Further, the water input module and the drainage module have a large size and cause a difficulty in installing the same in a small or narrow space.

Accordingly, there is currently an increased need for development of a novel and advanced apparatus for cleaning a toilet device with a relatively slim and compact structure in order to achieve convenience in supplying water and, in addition, to prevent a problem of overflowing or unnecessary flow of water to the surroundings.

DISCLOSURE

Technical Problem

The present invention has been proposed to overcome the problems of the above mentioned processes, and a major object of the present invention is to provide an apparatus for cleaning a pet toilet device, with a characteristic in that water is supplied through a water container that can be simply delivered in an environment in which water could not be directly supplied, including: a main module having an automatic-cleaning function as well as a sensing function; and a sub-module, wherein these modules form a single set together with the toilet device, resulting in a compact and slim structure.

An additional object of the present invention is to fit an air outlet in a water input pipe in order to prevent a problem of water flowing to the surroundings or to prevent the same from becoming dirty.

Technical Solution

In order to accomplish the above objects, in accordance with one aspect of the present invention, provided is a modular apparatus for cleaning a pet toilet device, including: a toilet device; a water container coupled at one side of a structure including a main module and a sub-module laminated to each other, which includes a water storage space and a lid part to be opened or closed in order to supply water; a sub-module provided with a water pump for injecting the water, which flowed from the water container to a tank via a supply pipe, toward the toilet device through a water input pipe; a main module provided at the bottom of the sub-module to be removably coupled with a water input module, which includes a drainage holder to receive sewage through a drain pipe, and a receiver to receive a signal from a transmitter, and a drain pump for pumping the sewage toward the drainage holder; and a controller that detects whether a pet defecates or not through a sensing signal by a sensing operation of the transmitter and the receiver, and then, controls driving of the water pump, wherein an air outlet extending at an angle toward an inner wall of the tank is formed at one side of a top end portion of the water input pipe so as to communicate with the same.

Advantageous Effects

The modular apparatus for cleaning a pet toilet device according to the present invention may accomplish the following effects in that:

(1) the sub-module and the main module are proposed to configure a compact structure in a laminate form and are neatly coupled with the water container, thus offering an environment in which the modular apparatus is conveniently usable even in a narrow space;

(2) owing to a specific structure of the water input pipe, a problem of water flowing to the surroundings is eliminated; and (3) by controlling a place, a time and a flow rate of water input to the toilet plate, further neat and clean environment for using the same may be offered.

<Description of Symbols>

| | |
|---|---|
| 10: Water container | 20: Elastic coupler |
| 100: Toilet device | 110: Net |
| 120: Toilet plate | 130a: Air outlet |
| 130b: Thru-hole | 131: First water input pipe |
| 132: Second water input pipe | 133: First injection port |
| 134: Second injection port | 140: Drain pipe |
| 150: Transmitter part | 200: Sub-module |
| 210: Cover | 220: Tank |
| 230: Water container supply hole | 235: Supply pipe |
| 241: First water pump | 242: Second water pump |
| 243: Pump housing | 250: Duct housing |
| 270: Water level sensor | 300: Main module |
| 301: Receiver | 311: First water level sensor |
| 312: Second water level sensor | 313: Third water level sensor |
| 320: Drain pump | 330: Drainage holder |
| 340: Drain gutter | 400: Controller |

BEST MODE

A most preferred embodiment of the present invention is a modular apparatus for cleaning a pet toilet device, including: a toilet device; a water container; a sub-module provided with a water pump for injecting the water, which flowed from the water container to a tank via a supply pipe, toward the toilet device through a water input pipe; a main module provided at the bottom of the sub-module to be removably coupled with the water input module, which includes a drainage holder to receive sewage through a drain pipe, a receiver to receive a signal from a transmitter, and a drain pump for pumping the sewage toward the drainage holder; a controller that detects whether a pet defecates or not through a sensing signal by a sensing operation of the transmitter as well as the receiver, and then, controls driving of the water pump, wherein an air outlet extending at an angle toward an inner wall of tank is formed at one side of a top portion of the water input pipe so as to communicate with the same.

[Description of Preferred Embodiment]

Hereinafter, preferred embodiments of the present invention will be described in more detail with reference to the accompanying drawings. These drawings were not made in a full scale and the same symbols in each of the drawings refer to the same components.

Figure 1:
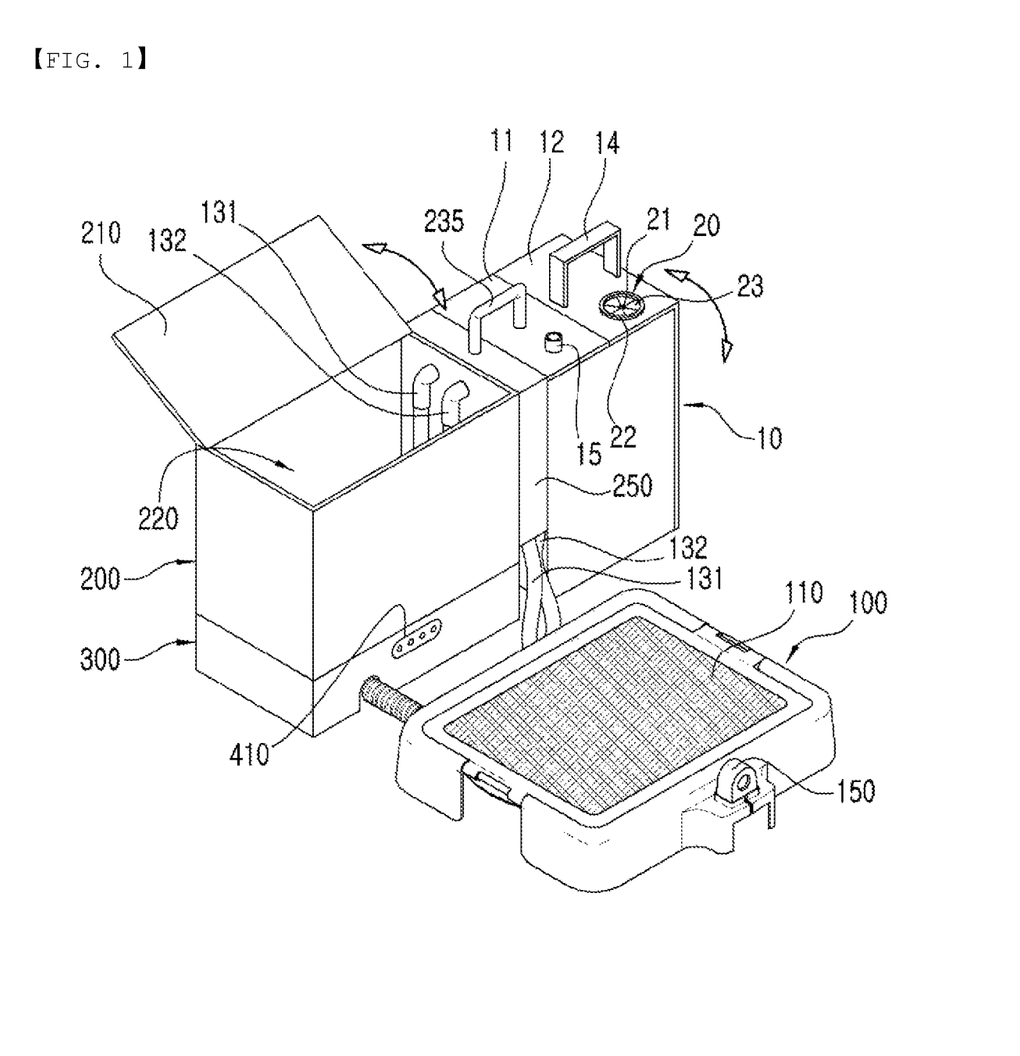
FIG. 1 is a perspective view illustrating a whole structure of an apparatus for cleaning a pet toilet device according to the present invention.
Figure 2:
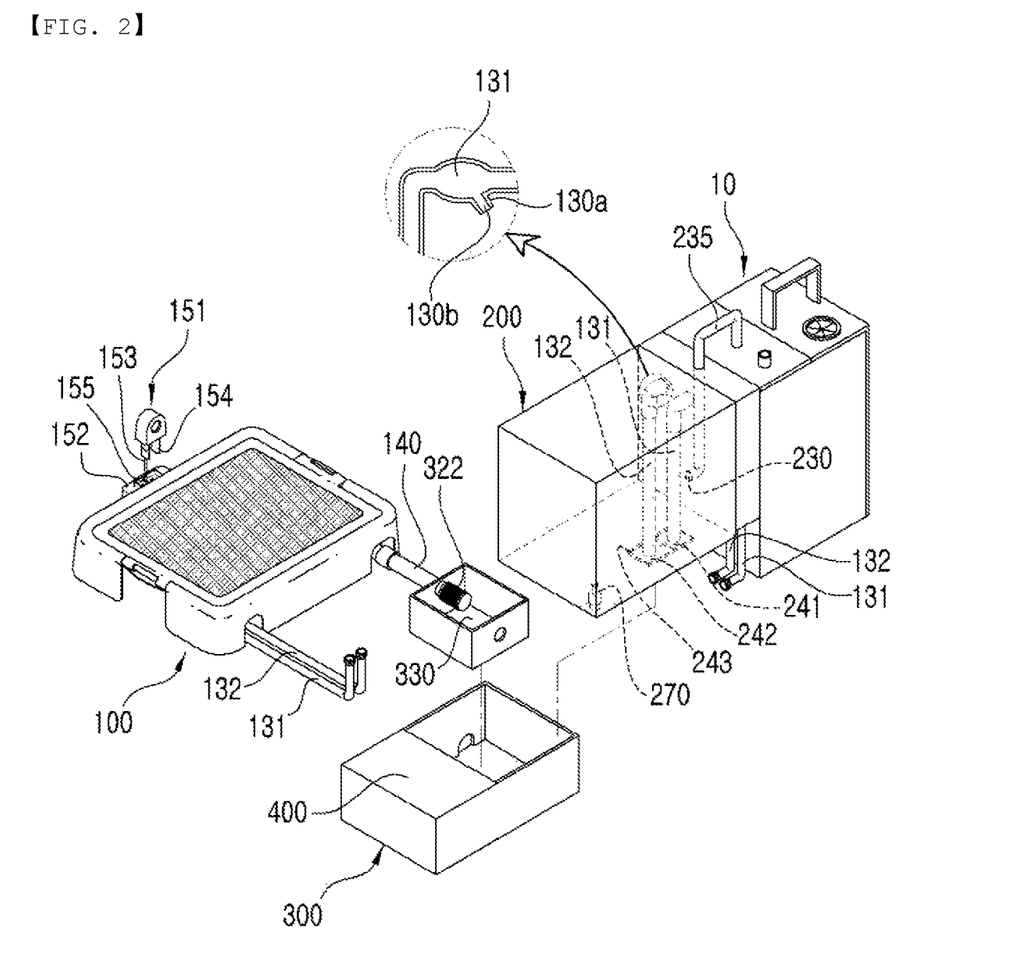
FIG. 2 is a projected perspective view illustrating a main module, a sub-module and a water container, which are separated from the apparatus for cleaning a pet toilet device according to the present invention.

FIG. 1 is a perspective view illustrating a structure of an apparatus for cleaning a pet toilet device according to the present invention, and FIG. 2 is a projected perspective view illustrating a main module, a sub-module and a water container, which are separated from the apparatus for cleaning a toilet device according to the present invention.

As shown in FIGS. 1 and 2, the toilet device 100 in the present invention receives and holds excreta (in particular, urine) of a pet, provides a space for receiving water supplied from a water container 10 to clean the same and, more particularly, includes: a net on which the pet sits and defecates; a toilet plate 120 equipped with an injection port for injecting cleaning water, preferably, first and second injection ports 133 and 134 (see FIG. 5); a water input pipe assembly 130 consisting of first and second water input pipes 131 and 132 to receive the cleaning water supplied from a sub-module 200; a drain pipe 140 to discharge the wastewater to outside or a main module 300 after completion of cleaning; and a transmitter part 150 to transmit an object detection signal to a receiver 301 of a main module 300.

First, the net 110 is often used in any typical toilet device 100, includes multiple thru-holes, is made in a thin panel form and is removably fitted on top of a toilet plate 120.

Figure 5:
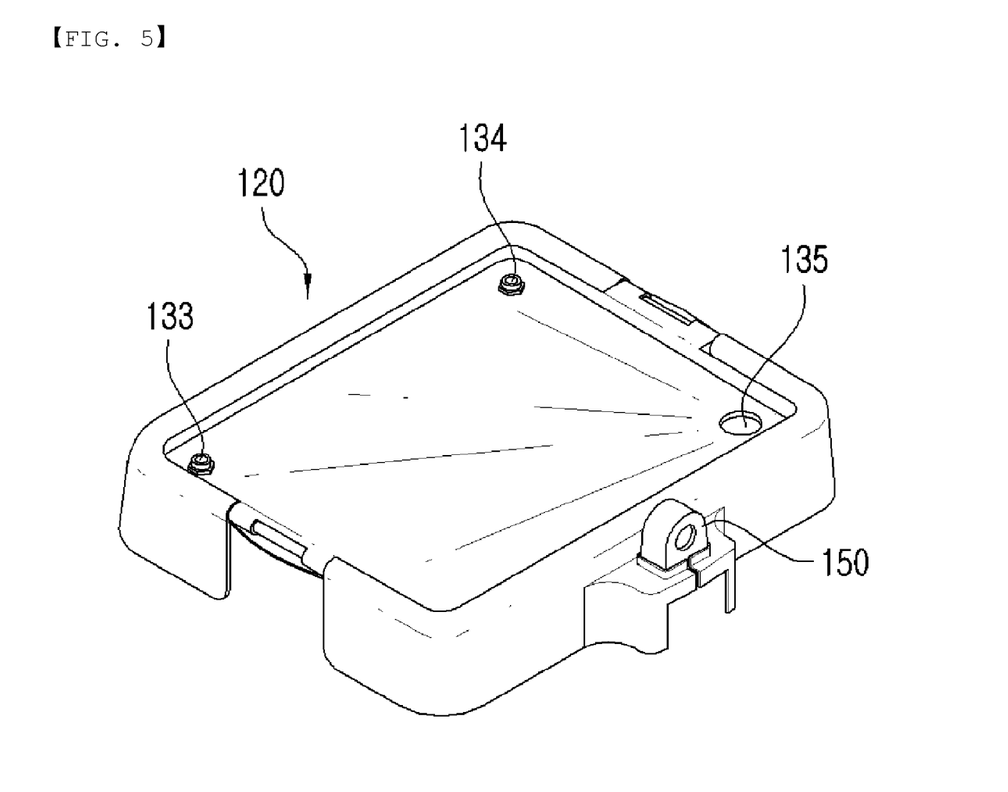
FIG. 5 is a perspective view illustrating an outer structure of a toilet plate.

Referring to FIG. 5, the toilet plate 120 serves to hold excreta (mostly urine) via the thru-holes of the net 110, is provided at the bottom of the net 110 to have a constant volume, and includes: a drain pipe 140 which discharges the wastewater (including urine) gathered after cleaning into a main module 300,wherein an inner space (of the toilet plate) is cleaned after injecting the water supplied from a sub-module 200 described below to the inner space; and a water input pipe to receive the water supplied for cleaning from the water container 10 or the sub-module 200.

A water input pipe assembly serves to supply and inject the water supplied from the sub-module 200 into a space of the toilet plate 120, wherein the water input pipe may be a single one or, as shown in FIGS. 1 and 2, preferably comprise first and second water input pipes 131 and 132 connected to first and second water pumps 241 and 242, respectively, in order to ensure efficient injection control, as described below.

Further, the first and second water input pipes 131 and 132 may have jet nozzles serving to finely regulate injection pressure and injection angle at ends thereof.

The drain pipe 140 serves as a duct to discharge sewage to the outside after cleaning, may directly discharge the sewage to the outside but, in consideration of some environments for installation without desired drainage equipment, may also discharge the sewage in connection with the main module 300.

The transmitter part 150 includes a transmitter 151 for emitting an object detection signal, e.g., an infrared ray, to a receiver 301 in the main module 300, more particularly, consists of the transmitter 151, a sensor housing 152 and a cable 153. Such a configuration of the transmitter part 150 and the receiver 301 and a function thereof are substantially identical to those described in Korean Patent No. 12821898 owned by the present applicant, which is incorporated herein by reference, and therefore, a detailed description thereof will be omitted.

Returning to FIGS. 1 and 2, it can be seen that the water container 10 is located at one side of a structure including the main module 300 and the sub-module 200 coupled to each other in a laminate form.

The water container 10 of the present invention serves to provide a space to store and/or hold the water drawn from an external water source, if no water source such as a water supply pipe in a bathroom/sink is present around a place at which the present invention apparatus is installed.

More particularly, the water container 10 consists of a hollow part 13 to store the cleaning water, and a fixed part 11 and a lid part 12 to form a top structure.

The lid part 12 is opened or closed through a hinge at a boundary of this part and the fixed part 11, so as to store the water in the hollow part 13, while the fixed part 11 is a flat panel to shield a part of the top face without such opening/closing function as described above.

In particular, the fixed part 11 includes a supply hole, through which a supply pipe 235 extending from the hollow part 13 to supply the water into the sub-module 200 can pass, and an opening thru-hole 15 which has a self-deodorization function and in which any deodorization material (deodorant cotton, cotton wool, etc.)can be removably inserted.

Further, the lid part 12 is equipped with a handle 14 for lifting and moving the water container 10 and may also include an elastic coupler 20 to fit a bottle, in which water is additionally stored (such as a PET bottle), upside down in the water container.

More particularly, the elastic coupler 20 includes an elastic member 22 formed of, for example, rubber or silicone, and formed around an opening port 21, so as to be tightly coupled by elastic force without a gap when the bottle (PET bottle) is coupled therein. Furthermore, the elastic coupler 20 includes an elastic blade 23 divided into multiple branches in a radial direction from the elastic member 22 to the center portion.

The elastic blade 23 closes the opening port 21 in a normal state and is elastically bent downward to accept a bottle when the bottle is inserted. Then, after taking the bottle out of the opening port 21, the elastic blade may elastically return to the original state.

Moreover, at one side of the water container 10, i.e., a side facing the sub-module 200, provided is a coupling part (not shown) to be removably coupled to the sub-module 200, so as to be neatly (or uniformly) arranged while being stably coupled to the sub-module 200.

Such a water container 10 as described above has advantageous characteristics of being more conveniently moved to supplement the cleaning water even in an installation environment in which water cannot be directly supplied from a water supply pipe in a bathroom or sink, as well as ensuring a simple delivery environment.

Figure 3:
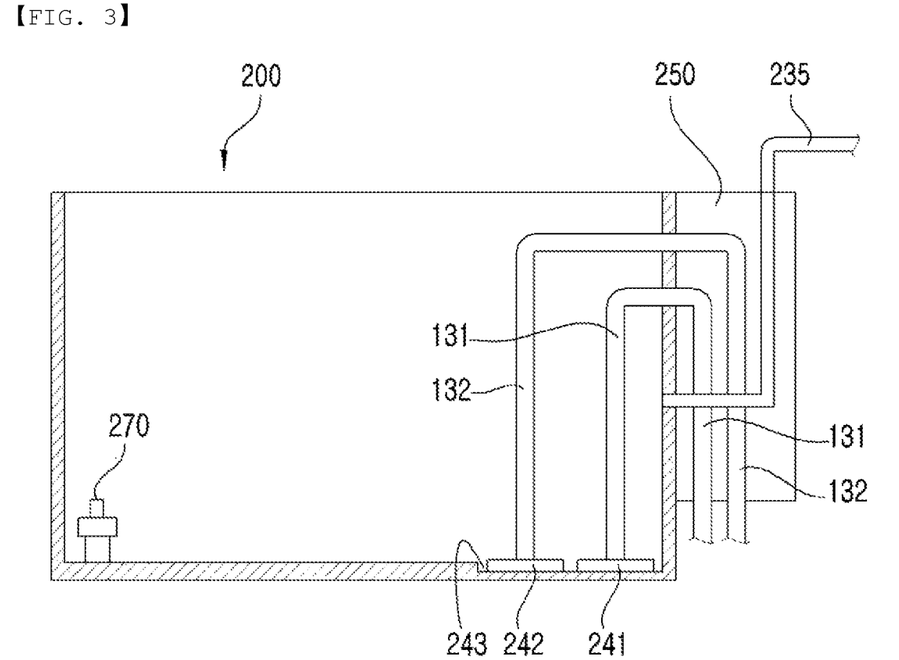
FIG. 3 is a cross-sectional view illustrating the sub-module according to the present invention.

FIG. 3 is a cross-sectional view illustrating the sub-module of the present invention.

As shown in FIG. 1 as well as FIG. 3, the sub-module 200 may be opened or closed by a cover 210 and, in particular, as shown in FIG. 3, has a tank form to receive water or the like therein. That is, the sub-module 200 includes a tank 220 to receive the water supplied from the water container 10 through the water supply pipe 235, in other words, the water for cleaning to be supplied to the toilet device 100.

A water container supply hole 230 (see FIG. 2) is pierced and formed at one sidewall of the tank 220 in the sub-module 200, through which the supply pipe 230 is connected in order to supply the water from the water container 10 to the tank 220.

Further, on a bottom surface of the tank 220, provided are a water level sensor 270 and first and second water pumps 241 and 242. The water level sensor 270 senses the water in the tank 220 and serves to detect whether an amount of the water supplied from the water container 10 as well as the tank 220 is insufficient or not. That is, the water level sensor 270 is provided to sense a water level of the water in the tank 220 of the sub-module 200 and, depending upon the sensed level, to control driving of the first and second water pumps 241 and 242, and therefore, may control driving of the water pumps 241 and 242 in communication with an alternative sub-module, i.e., a water pump control module in a controller 400 described below.

Each of the water pumps serves to inject the cleaning water stored in the tank 220 to the toilet device 100 through the water input pipe. Herein, the water pumps 241 and 242 are accepted in a pump housing 243 further protruding downward from the bottom surface of the tank 220, so as to prevent the water from unnecessarily flowing or sloshing due to a flow rate of the water.

Preferably, the water pump of the present invention may comprise two pumps, that is, the first water pump 241 and the second water pump 242, which can be connected to the first and second water input pipes 131 and 132, respectively.

In other words, the present invention is characterized in that two different water pumps, that is, the first and second water pumps 241 and 242, are provided in order to control a flow rate and time-differential supply and/or to control water injection. Therefore, a predetermined time after a pet has finished peeing, the first and second water pumps 241 and 242 are driven by a control operation of the controller 400 described below to conduct water injection to the toilet device 100 through the first and second water input pipes 131 and 132.

A water input hole is a hole pierced through one sidewall of the tank 220 so as to pass the water input pipe through the same, which may comprise first and second water input holes corresponding to the first and second water input pipes 131 and 132, respectively. Further, the water input pipes 131 and 132 starting from the first and second water pumps 241 and 242 may extend to the toilet device 100 through these water input holes. In particular, each of these water input holes is pierced at a top end portion among a lateral surface part of the sub-module 200 and may more efficiently prevent a water leakage problem, as compared to a case where the water input hole is formed at a bottom end portion. Further, a problem of unnecessary flow of the water in the water input pipes 131 and 132 to the surroundings to thus become dirty when separating the water container 10 from the sub-module 220 may be prevented by the above structure.

The water input pipes (the first and second water input pipes) 131 and 132 have a structure wherein these pipes extend approximately perpendicular to the water pumps (the first and second water pumps) 241 and 242, are bent and extending around the water input holes, pass the outside of the water input holes, and then, extend to the toilet device 100.

Further, even though not shown in the drawings, the water input pipe may extend while being twisted in a coil spring or screw form such as a telephone cord or shower hose.

In particular, referring to FIG. 2, it can be seen that a hollow air outlet 131*a* is formed at one side of the top end portion around the water input hole in the water input pipe, which extends at an angle toward an inner wall of the tank 220.

In a state of water injection, such an air outlet 130*a* discharges a small amount of water and air toward the tank 220 when the water is injected into the toilet device 100 through the water input pipe. If there is a lack of water in the sub-module 200 and no more water is supplied, the air outlet discharges air and serves to return the water, which is rising along the water input pipe, to the tank 220.

When separating the water input pipe from the toilet device 100 in order to clean the toilet device, if the water injected from the water pumps 241 and 242 is still present in the water input pipes 131 and 132, this water flows down to the surroundings along the water input pipes 131 and 132 already separated from the toilet device 110, thus causing a problem that the surroundings undesirably become dirty.

As such, the air outlet 130*a* is additionally installed to prevent the above problem and, more particularly, has such a performance that, when the water input pipes 131 and 132 are separated from the toilet device 100, the water remaining in the water input pipes 131 and 132 flows down along the water input pipes 131 and 132, then, escapes together with residual air via a thru-hole 130b of the air outlet 130a, and is finally received again in the tank 220.

Of course, the water to be injected toward the toilet device 100 via a thru-hole 130b of the air outlet 130a may partially flow down, however, an amount thereof is not significant and does not affect a desirably sufficient injection pressure/injection rate to be retained. Further, owing to the slanted and extended structure (that is, the structure extending at an angle toward the inner wall of the tank), the water discharged thereon flows along the inner wall of tank 220, which in turn, prevents a problem of surprising the pet due to occurrence of undesirable water dropping noise.

Further, a duct housing is installed at one side of the sub-module 200, that is, at a side facing the water container 10.

The duct housing 250 is provided to prevent the water input pipes 131 and 132 as well as the supply pipe 235 from being exposed outside and becoming messy and, simultaneously, offer a connection structure to the water container. More particularly, the duct housing may be removably coupled to the sub-module 200, and further includes a coupling part (not shown) to be removably coupled with the coupler in the water container 10 at one side facing the water container 10. That is, the duct housing 250 may shield a plurality of complicated pipes to thus ensure more neatly and cleanly arranged appearance.

Figure 4:
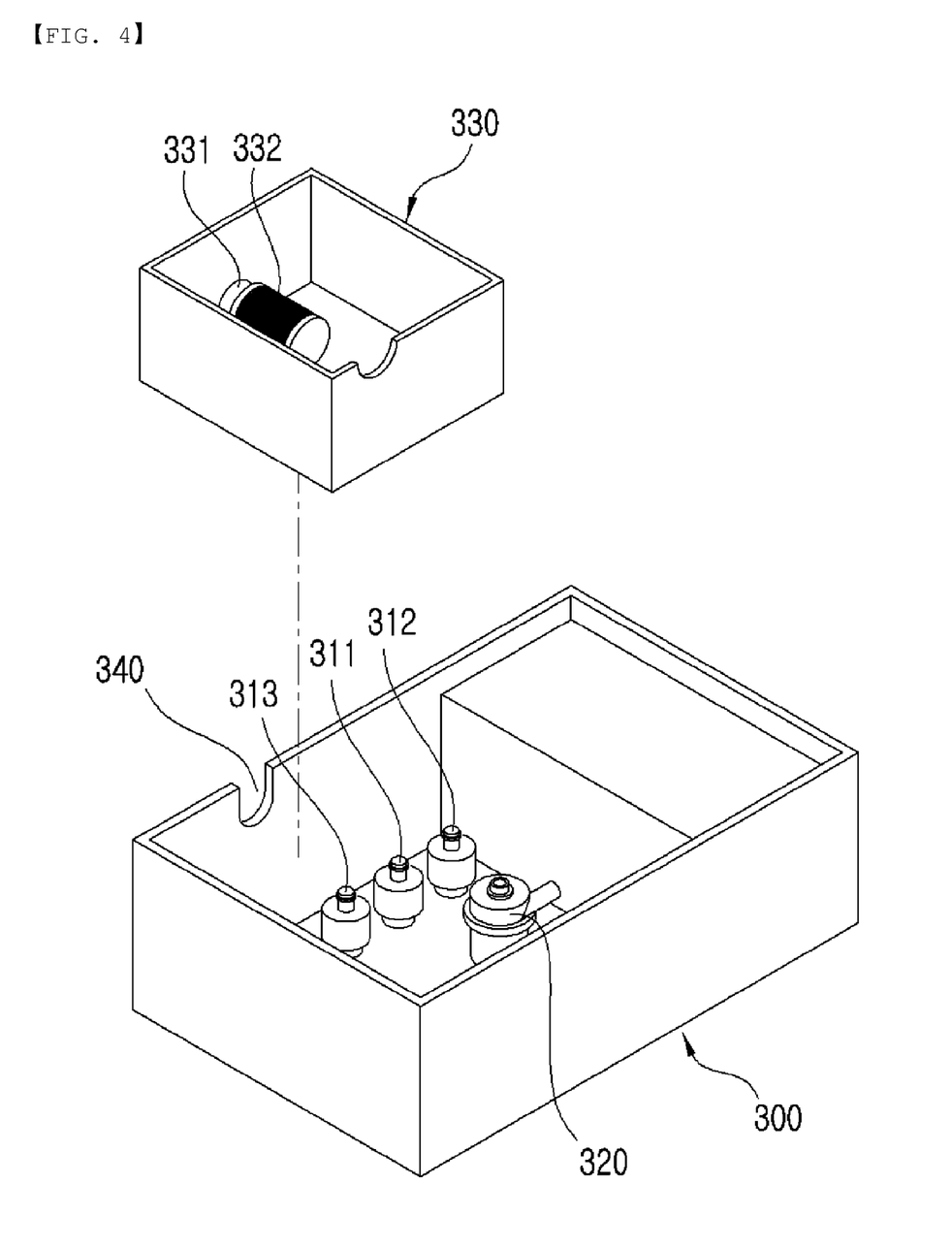
FIG. 4 is an exploded perspective view illustrating structures of the main module and a drainage holder according to the present invention.

FIG. 4 is an exploded perspective view illustrating structures of the main module and a drainage holder according to the present invention, which are seen from a bottom side of the main module.

Referring to this figure, it can be seen that a main module 300 is connected at the bottom of the sub-module 200.

The main module 300 of the present invention is located at the bottom of the sub-module 200 and removably coupled with the same and, in general, may have a structure wherein the lower part of the sub-module 200 is seated on top of the main module 300 or is accepted inside the main module 300, wherein both of these modules may be coupled at a coupling site between the sub-module 200 and the main module 300 by a module coupler formed with an uneven structure.

Such a module coupler may comprise any of various and well-known coupling means and include a locking means to offer an external force, thus ensuring further rigid coupling relationship at the coupling site between the sub-module 200 and the main module 300.

The main module 300 includes a controller 400 and, simultaneously, the receiver 301, the water level sensor 310, the drain pump 320 and the drainage holder 330.

Referring to FIG. 1, it can be seen that the receiver 301 is provided at one side of the main module 300, that is, the side facing the toilet device 100 (or a control panel described below).

The receiver 301, as described above, serves to receive a signal from the transmitter 151 so that, depending upon whether the receiver 301 receives the signal from the transmitter 151 or not, an object between the transmitter 151 and the receiver 301 such as the presence of a pet, may be detected. This configuration has been concretely described in Korean Patent No. 1282198 owned by the present inventors.

Further, the water level sensor 310 is provided at a site around the drain pump 320 among the bottom side portion of the main module 300, more particularly, at a bottom surface of the drainage holder 330.

As shown in FIG. 4, the water level sensor installed in the drainage holder 330 is provided to sense a level of the sewage stored in the drainage holder 330 of the main module 300 and, depending upon the sensed level, to control driving of the drain pump 320. In the present disclosure, an illustrative example of the water level sensor consisting of three water level sensors, that is, first, second and third water level sensors 311, 312 and 313 will be described.

The first, second and third water level sensors 311, 312 and 313 have different lengths, respectively, and are equipped with separate sensing parts. When each of the sensing parts touches the water, this carries out a sensing operation and serves to generate a water level signal while rising along the body of the water level sensor by buoyancy. Otherwise, any one among the first, second and third water level sensors 311, 312 and 313 may accept the other sensors with different lengths, resulting in a configuration of a total of two (2) sensors.

The water level signal generated according to the principle described above is sent to the controller 400, which in turn, controls driving of the drain pump 320 in order to discharge the water to an external drainage system. This process will be more concretely described in the following description with regard to the controller 400.

The drain pump 320 serves to lead the sewage discharged from the toilet device 100 to the drainage holder 330 and further plays a role in draining the sewage toward an external sewage treatment system connected to the drainage holder 330.

Further, the main module 300 includes the drainage holder 330 inside a drain gutter 340 through which the drain pipe 140 of the toilet device 100 may pass.

In this case, the drain pipe 140 is provided to extend at a higher position, compared to the prior art, otherwise, to extend at an upper site with a predetermined height over a bottom surface of the toilet device. Furthermore, when the water is discharged around the drain pipe through an injection port at an end of the water input pipe, excess clean water may be gathered around the same (that is, a lower space in the drain pipe), thereby enabling treatment of the odor of the sewage in the drain hole not to leak to the outside.

The drainage holder 330 has the form of a storage type or sliding-movable type box, is accepted in a hollow portion of the main module 300, and has a drain connection hole 331 to receive the sewage flowing from the drain pipe 140, wherein a filter 332 may be included therein at one side.

The filter 332 functions to filter impurities (hair of a pet, small feces, etc.) in the sewage or prevent the bad odor and, for example, may be made in a filtering sieve form in which multiple thru-holes are provided on an inner wall passing across an inner space of the drainage holder 330. Otherwise, the filter 332 may be coupled at an end portion of the drain pipe 140 passing through the drain connection hole 331 and extending into the toilet device 100.

Moreover, although not shown in the drawings, the filter 332 may include a deodorant box inside a main body of the filter 332 to prevent the bad odor, and a partition may be provided inside the drainage holder 300 wherein a space is separated into first and second rooms and any one among these rooms may have the filter 332.

FIG. 5 is a perspective view illustrating an outer structure of the toilet plate.

As shown in FIG. 5, the toilet plate 120 has a slanted surface toward a drain hole 135, and the drain hole 135 has a first injection port 133 and a second injection port 134 formed at both opposite ends of the drain hole 135, respectively.

The first injection port 133 is connected to the first water input pipe 131 to inject the water drive-controlled by the first water pump 241 while the second injection port 134 is connected to the second water input pipe 132 to inject the water drive-controlled by the second water pump 242.

Further, although not shown in the drawings, jet nozzles may be removably coupled at the ends of these first and second injection ports 133 and 134, in order to finely regulate an injection angle.

Figure 6:
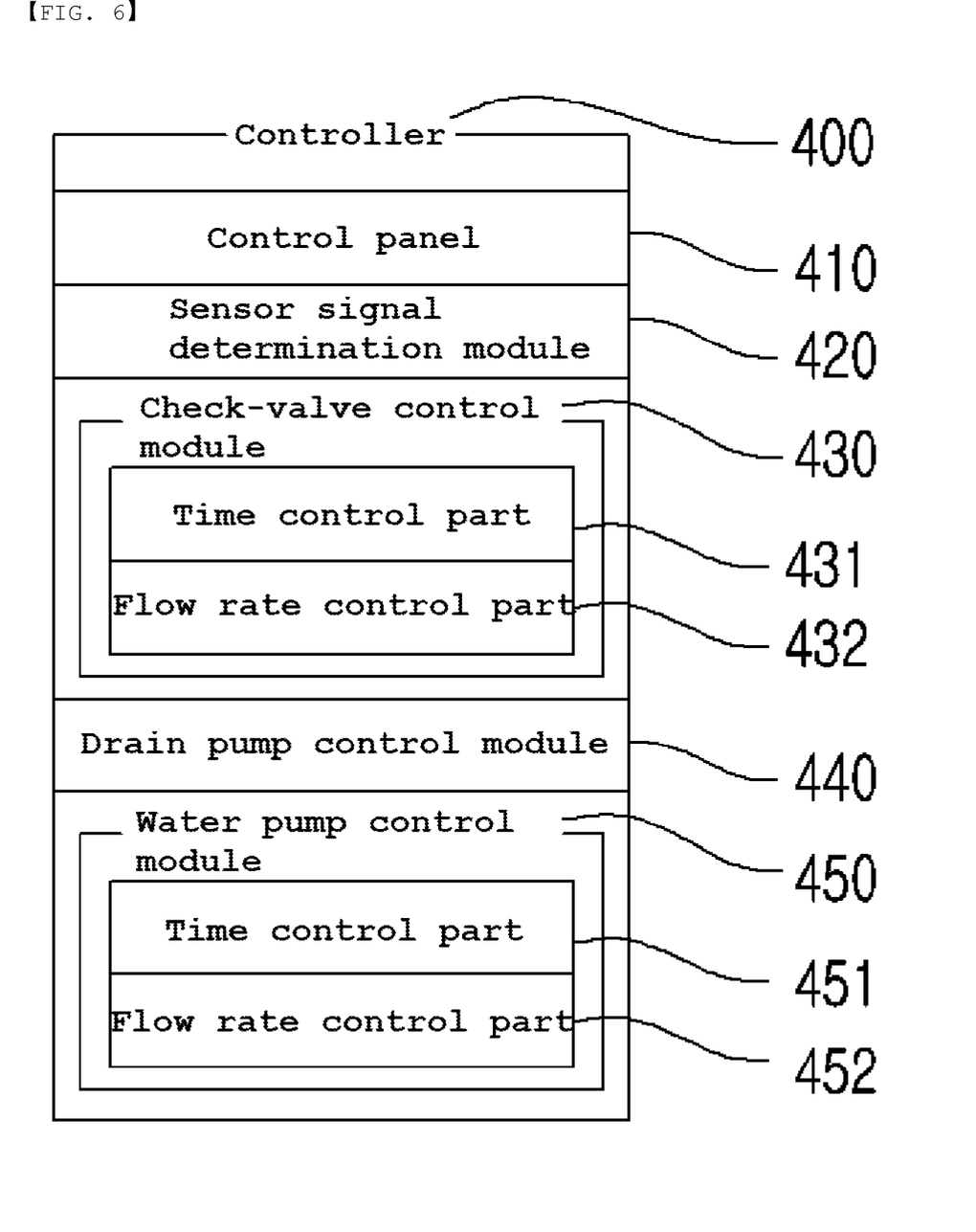
FIG. 6 is a block diagram illustrating a configuration of a controller according to the present invention.

FIG. 6 is a block diagram illustrating a schematic configuration of the controller according to the present invention.

The controller 400 of the present invention is installed in the sub-module or the main module 300 and, in this disclosure, an illustrative example of the controller installed in the main module 300 is shown.

More particularly, the controller 400 fundamentally includes a control panel 410, a sensor signal determination module 420, a water pump control module 450 and a drain pump control module 440 and, in a case of configuring the main module 300 alone, may further include a check-valve control module 430.

The control panel 410 may be located at a front site of the main module 300, that is, where the receiver 301 is provided. This panel may be formed of simple operation keys or may also include multiple lamps (LED lamps) to visually indicate 'no water' or the like, and input keys (switches, keyboards, buttons, etc.), as well as the receiver 301.

The sensor signal determination module 420 receives the sensing signal by a sensing operation of the sensor part, that is, the transmitter 151 and the receiver 301, and then, functions to detect whether the pet has defecated exactly in or around the cleaning apparatus of the present invention. That is, when the receiver 301 receives a signal sent from the transmitter 151, it may be determined that the pet is not present on the toilet device 100, that is, on the net 110. On the other hand, if the receiver 201 does not receive any signal emitted by the transmitter 151, the above module may serve to determine that the pet is present on the toilet device 100.

The check-valve control module 430 serves to control on/off driving of two check-valves, that is, first and second check-valves separately installed in the main module 300 when the sensor signal from the sensor signal determination module 420 is sent to the check-valve control module 430. This module may be optionally provided when the main module is driven alone. More particularly, this module may include a time control part 431 and a flow rate control part 432.

The time control part 431 serves to control on/off driving of the first and second check-valves in a time series mode. In other words, the water flowing through the first check-valve passes through the first water input pipe 131 and is injected from the first injection port 133 and, after a preset time interval (about 1 to 10 seconds), the water flowing through the second check-valve passes through the second water input pipe 132 and is injected from the second injection port 134. As a result, it is possible to achieve such a characteristic that an overflow problem caused by simultaneously opening the first and second check-valves may be prevented while washing the whole toilet plate.

The flow rate control part 432 controls on/off degree of the first and second check-valves to treat an amount of the water flowing through the first and second check-valves in a differential mode. For instance, the amount of water treated through the first check-valve may be larger or smaller than that treated through the second check-valve.

The drain pump control module 440 serves to control driving of the drain pump 320, more particularly, differentially controls actuation and rate of rotation of the drain pump depending upon whether the first, second and third water level sensors 311, 312 and 313 have generated water level signals or not.

For instance, when comparing a case where the first water level sensor 311 having the largest length senses water and generates a water level signal and another case where the third water level sensor 313 having the smallest length senses water and generates another water level signal, the latter has a higher water level. Therefore, the drain pump 320 starts actuation at once and is driven at the highest rate of rotation. On the other hand, since the former does not yet have a high water level, the drain pump may not be driven or, even if it is driven, may have a low rate of rotation. As such, differential control may be applied to driving of the drain pump 320.

Further, the water pump control module 450 senses a water level through an alternative water level sensor 270 installed in the tank 220 of the sub-module 200 and controls a driving of the water pumps 241 and 242 depending upon the sensed level. If the sensed level is detected not to reach a reference water level, this module stops driving of the water pumps 241 and 242, instead, visually displays "no water" (or "low water") via an LED lamp by a control panel 410 or generates an alarm sound through an additional speaker, so as to instruct a user to replenish water in the tank.

Further, the water pump control module 450 serves to drive the first and second water pumps 241 and 242 when the sensor signal is sent from the sensor signal determination module 420, followed by injection of water to the toilet device 100. Based on the same principle as applied to the check-valve control module 430, the above module 450 may also involve a time control part 451 and a flow rate control part 452.

Although the apparatus for cleaning a toilet device of the present invention has been described in relation to a dog, the apparatus may also be applied to cleaning of cat defecation. In addition, if a wall extending upward at one side of the toilet device is further provided, it is possible to prevent a splashing excreta problem.

As described above, a structure and operation of a modular apparatus for cleaning a pet toilet device according to the present invention have been described in the above detailed description and drawings. However, these are proposed only as illustrative examples and the spirit of the present invention is not limited to the above description and drawings, however, various changes thereof would of course be possible without departing from the technical spirit and scope of the present invention.

INDUSTRIAL APPLICABILITY

The present invention is possible to provide a product capable of mass production and has industrial applicability.

The invention claimed is:

1. A modular apparatus for cleaning a pet toilet device, comprising,
a pet toilet device including: a net on which a pet sits for defecation; a toilet plate for receiving excreta of the pet from the net and discharging through a drain hole, which has injection ports provided at opposite ends of the drain hole; a water input pipe to guide the water supplied from a sub-module to the injection ports; a drain pipe to discharge sewage input through the drain hole after cleaning the toilet plate; a transmission sensor part equipped with a transmitter for sending a signal to a reception sensor;
a water container coupled at one side of a structure including a main module and the sub-module laminated to each other, which includes a water storage space and a lid part to be open or closed in order to supply water;
a sub-module provided with a water pump for injecting the water, which flowed from the water container to a tank via a supply pipe, toward the toilet device through the water input pipe;
a main module provided at a bottom of the sub-module to be removably coupled with a water input module, which includes: a drainage holder to receive the sewage through the drain pipe, the receiver to receive a signal from the transmitter, and the drain pump for pumping the sewage toward the drainage holder; and
a controller that detects whether a pet defecates or not from a sensing signal by a sensing operation of the transmitter and the receiver, and then, controls driving of the water pump,
wherein an air outlet extending at an angle toward an inner wall of the tank is formed at one side of a top end portion of the water input pipe so as to communicate with the same.

2. The apparatus according to claim 1, wherein the main module includes at least two water level sensors having different lengths which are provided at a bottom surface of the main module, and sense a level of the sewage stored in the drain module through a sensing part rising and falling along a main body of the water level sensor by buoyancy and then generate a water level signal; and
wherein the controller includes a drain pump control module to control driving and rate of rotation of the drain pump in a differential mode, depending upon whether the water level signal generated by the water level sensors is transmitted or not.

3. The apparatus according to claim 1, wherein the water container includes an opening port pierced at one side of a top surface of the water container; and an elastic coupler which has an elastic member formed around the opening port and a plurality of elastic blades formed in a radial direction around the elastic member.

4. The apparatus according to claim 1, wherein the sub-module includes a water level sensor formed on a bottom surface thereof; and
wherein the controller further includes a water pump control module which controls driving of the water pump, depending upon the water level sensed by the water level sensor in the sub-module.

5. The apparatus according to claim 4, wherein the water pump consists of first and second water pumps,
the water input pipe consists of a first water input pipe connected to the first water pump and a second water input pipe connected to the second water pump,
the injection port consists of a first injection port connected to the first water input pipe and a second injection port connected to the second water input pipe, and
wherein the water pump control module includes a time control part to control driving of the first and second water pumps in a time-differential mode, such that: firstly, the water flowing through the first water input pipe is injected from the first injection port and, after a preset time interval, the water flowing through the second water input pipe is then injected from the second injection port.

6. The apparatus according to claim 1, wherein the drainage holder includes a filter for filtering impurities in the sewage, wherein the filter consists of an opening part coupled to a cross-section of the drain pipe and a main body having multiple thru-holes formed thereon.

* * * * *